United States Patent [19]
Digeser et al.

[11] Patent Number: 6,082,325
[45] Date of Patent: Jul. 4, 2000

[54] PROCESS AND SYSTEM FOR OPERATING A DIESEL ENGINE

[75] Inventors: Steffen Digeser, Fellbach; Frank Duvinage, Kirchheim; Hans Fausten, Winterbach; Walter Friess; Anton Kerckhoff, both of Stuttgart; Thomas Liebscher, Fellbach; Stefan Pischinger, Aachen; Marco Stotz, Stuttgart, all of Germany

[73] Assignee: DaimlerChrysler AG, Suttgart, Germany

[21] Appl. No.: 09/190,225

[22] Filed: Nov. 13, 1998

[30] Foreign Application Priority Data

Nov. 13, 1997 [DE] Germany .................. 197 50 226

[51] Int. Cl.⁷ .................. F02D 41/14; F01N 3/18; F02B 1/14

[52] U.S. Cl. .................. 123/299; 60/274; 60/278; 60/285; 60/297; 60/602; 123/336; 123/568.21

[58] Field of Search .................. 123/299, 300, 123/305, 336, 568.11, 568.21; 60/274, 278, 285, 297, 301, 311, 602, 603, 605.2

[56] References Cited

U.S. PATENT DOCUMENTS

| | | |
|---|---|---|
| 5,404,719 | 4/1995 | Araki et al. .................. 60/276 |
| 5,437,153 | 8/1995 | Takeshima et al. .................. 60/285 X |
| 5,732,554 | 3/1998 | Sasaki et al. .................. 60/285 X |
| 5,746,989 | 5/1998 | Murachi et al. .................. 60/301 X |
| 5,771,686 | 6/1998 | Pischinger et al. .................. 60/274 |
| 5,992,142 | 11/1999 | Pott .................. 60/274 |
| 5,996,338 | 12/1999 | Hirota .................. 60/285 |

*Primary Examiner*—Tony M. Argenbright
*Attorney, Agent, or Firm*—Evenson, McKeown, Edwards & Lenahan, P.L.L.C.

[57] ABSTRACT

A system and a process for operating a diesel engine using an automatic engine control which, as a function of characteristic diagrams, automatically controls the operation of the diesel engine and permits an automatic rich/lean controlling of the diesel engine. The automatic engine control includes a computer which, as a function of predetermined change-over criteria, causes a change-over to the rich or the lean operation of the diesel engine. A sensor system communicates with the computer and monitors the parameters necessary for change-over criteria. A memory communicates with the computer, the memory storing separate characteristic diagrams for the operation of the diesel engine for the lean operation and for the rich operation.

18 Claims, 3 Drawing Sheets

PROCESS AND SYSTEM FOR OPERATING A DIESEL ENGINE

BACKGROUND AND SUMMARY OF THE INVENTION

This application claims the priority of German patent 197 226.1-26, filed Nov. 13, 1997, the disclosure of which is expressly incorporated by reference herein.

The invention relates to a process for operating a diesel engine using an automatic engine control which automatically controls the diesel engine as a function of characteristic diagrams between a rich operation and a lean operation.

From German Patent Document DE 43 34 763 A1, a process is known for operating an internal-combustion engine, in which an adsorption device for nitrogen oxides ($NO_x$) is arranged in an emission control system. At an air-fuel ratio lambda ($\lambda$) at which the exhaust gas flowing into the adsorption device is "lean", that is, when an overstoichiometric exhaust gas mixture with $\lambda>1$ is present, the adsorption device will adsorb $NO_x$. The adsorbed $NO_x$ which was stored in this manner is released when the air-fuel ratio lambda of the exhaust gas flowing in the adsorption direction becomes "rich"; that is, when $\lambda<1$ or when the combustion exhaust gases are present at an understoichiometric ratio. In this known process, the temperature of the $NO_x$-adsorption device is increased by injecting fuel into the exhaust gas and is lowered by blowing air into the exhaust gas in order to keep the working temperature of the $NO_x$-storage device within a defined range.

From German Patent Document DE 195 43 219 C1, a process of the initially mentioned type is known in which a sensor arranged downstream of the storage catalyst is provided for sensing the $NO_x$-concentration in the exhaust gas flow which, when an $NO_x$ storage threshold value is reached which, with respect to the characteristic diagram varies as a function of the rotational speed and the load, triggers a change-over from an operation of the diesel engine with $\lambda>1$ to an operation with $\lambda<1$. During an operation of the diesel engine with $\lambda<1$, the storage catalyst is regenerated and the nitrogen oxides $NO_x$ are reduced.

An object of the present invention is to develop a process of the initially mentioned type such that the $NO_x$ storage process and the regeneration process of a storage catalyst, through which the exhaust gases of the diesel engine flow, and the operating performance of the diesel engine are improved, particularly during the regeneration process.

This and other objects have been achieved according to the present invention by providing a process for operating a diesel engine having an automatic engine control which automatically controls the diesel engine as a function of characteristic diagrams between a rich operation and a lean operation, said process comprising: controlling a changeover between said rich operation and said lean operation as a function of predetermined change-over criteria via a computer; monitoring parameters necessary for said change-over criteria via a sensor system communicated with the computer; and selectively recalling separate characteristic diagrams and for the lean operation and the rich operation of the diesel engine stored in a memory which communicates with the computer.

This and other objects have been achieved according to the present invention by providing a system for operating a diesel engine, having an automatic engine control which automatically controls the diesel engine as a function of characteristic diagrams between a rich operation and a lean operation, said automatic engine control comprising: a computer which controls a changeover between said rich operation and said lean operation as a function of predetermined change-over criteria; a sensor system which communicates with the computer and monitors parameters necessary for said change-over criteria; and a memory which communicates with the computer and in which separate characteristic diagrams and for the operation of the diesel engine are stored for the lean operation and for the rich operation.

The invention is based on the general idea of providing separate characteristic diagrams or separate groups of characteristic diagrams for the lean operation as well as for the rich operation of the diesel engine, whereby an engine tuning is achieved which is optimally adapted to the respective operating performance. Although an understoichiometric combustion ($\lambda<1$) in the diesel engine necessary during the rich operation for forming reducing exhaust gas necessitates an engine tuning which is changed completely from that of the lean operation, particularly with respect to the fresh air feed and to the fuel injection operation, the present invention utilizes specifically worked-out characteristic curves to ensure an operating performance for a diesel engine which is expedient and advantageous also for the rich operation. For example, it is contemplated to design the engine tuning such that the soot emission values remain within acceptable limits, in particular, no visible smoke discharge taking place. Likewise, it is contemplated to tune the operating performance of the diesel engine by selecting special characteristic diagrams such that the driver and other vehicle occupants do not perceive the change-over between the different operating phases or the presence of different operating phases as being disturbing or do not even notice it at all. An aspect which is important in this respect is the smooth running of the diesel engine which can be kept within acceptable ranges by using specifically worked-out characteristic curves also in the rich operation.

In order to obtain a rich operation of the diesel engine, during which an adsorber system is regenerated which is connected behind the diesel engine, the diesel engine can be operated, for example, with a fuel feed which is increased in comparison to that of the lean operation.

Corresponding to a preferred embodiment of the process and system according to the invention, the characteristic diagrams for the rich operation of the diesel engine are selected for this purpose such that, in comparison to the lean operation, the fuel combustion in the respective combustion chamber takes place only relatively far after the top dead center position of the respective piston, that is, at relatively large crankshaft angles. The fuel combustion in the case of diesel fuels is composed of a precombustion (premixture combustion) and of a main combustion (diffusion combustion). Here, the late combustion essentially concerns the diffuse phase of the fuel combustion. Since the fuel combustion takes place late, it can no longer take place completely so that this is one of the reasons why the combustion air ratio lambda is reduced. However, this measure also deteriorates the efficiency of the engine such that clearly higher fuel quantities are required for being able to achieve the same engine power as in the lean operation. Since, in the case of a constant fresh air feed, the larger fuel quantity which exists in this phase can partially no longer be burnt, the combustion air ratio lambda is also reduced and the diesel engine is operated in a rich manner.

Corresponding to a further development of the process and system according to the invention, the point in time at which the diffusion combustion of the fuel takes place can be influenced by the point in time at which the main fuel injection starts and/or by the injection duration and/or by the injection quantity and/or by the injection pressure. For example, due to a late injection start, only a portion of the injected fuel quantity is burnt completely, whereas the remainder of the injection fuel quantity is essentially processed; that is, the long-chain fuel molecules are cracked to short-chain molecules; and is oxidized. In such a rich engine operation, this results in a considerably increased emission of unburnt hydrocarbons (HC) and carbon monoxide (CO). These intentionally achieved HC and CO reaction products are used as reducing agents on adsorber surfaces for converting nitrogen oxides $NO_x$ to nitrogen $N_2$. Thus, during a rich engine operation, the exhaust gases have the reducing atmosphere required for regenerating the adsorber system.

If the injection parameters, such as the start, the duration, the quantity, and the pressure, are appropriately coordinated, the fuel fraction which does not participate in the development of the engine power, that is, the fuel fraction which forms the reducing atmosphere in the exhaust gas, can be varied in a limited range almost without any influence on the engine power. This has the result that, in this range of the rich operation, the diesel engine delivers approximately the same power as in the corresponding lean operation. The alternation between the operating modes can therefore take place without being noticed by the driver. At the same time, the above-mentioned range, in which the injected fuel quantity can be varied almost without any engine power change, permits a targeted influencing of the exhaust gas composition, particularly the adjustment of the reducing agent quantity to a desired value or to a value required in the respective operating point. Likewise, by suitable selection of the injection parameters, particularly the injection start and its duration, the ratio of hydrocarbons to carbon monoxide can be adjusted in a predetermined manner.

For improving the engine tuning, corresponding to an expedient further development of the process and system according to the invention, a preliminary (or pilot) fuel injection can take place before the main fuel injection, which preliminary fuel injection is changed in comparison to the lean operation with respect to the injection start and/or the injection duration. The preliminary fuel combustion also influences the operating performance of the diesel engine. Since, during the operation of the diesel engine according to the invention with a very late main fuel combustion, there may be vibrations and particularly a erratic running of the engine, in an expedient embodiment of the process and system according to the invention, the preliminary injection is coordinated with respect to the injection start and the injection operation with the delayed main or diffusion combustion such that essentially a uniform smooth running of the engine can again be ensured.

Through the above-mentioned measures for delaying the main fuel injection, the diffusion combustion is essentially influenced.

In another, particularly preferred embodiment of the process and system according to the invention, the point in time of the start of the main fuel injection is selected so late that a premixture combustion occurs in the case of a diesel engine with an exhaust gas recirculation in operating points with a relatively high exhaust gas recirculation rate. In this case, the injection point in time is preferably selected such that the diffusion combustion changes predominantly to a premixture combustion. This change from the diffusion combustion to the premixture combustion takes place because, when the diffusion combustion starts very late, relatively large quantities of unburnt hydrocarbons are formed, of which a large portion is again fed by way of the exhaust gas recirculation together with fresh air to the combustion spaces of the engine. Because of the compression taking place there, this results in a very good homogenized mixture which, when the ignition limit is reached, leads to a premixture combustion long before the upper dead center of the respective piston. In this case, combustion air ratios of $\lambda<1$ can also be implemented.

Corresponding to an expedient further development, in an injection performance in which the complete diffusion combustion changes to a predominant premixture combustion, additional reducing agent can be produced by a late post-injection of fuel. In this case, the fuel which was post-injected very late is essentially only still evaporated and, if at all, is cracked and/or burnt only to a small proportion. The evaporated fuel is used in the exhaust gas as an additional reducing agent which is produced inside the engine and which can be used for regenerating the adsorber system.

In another advantageous embodiment of the process according to the invention, after the main fuel injection, a fuel post-injection can take place which, particularly with respect to the start, the duration, and the quantity, is selected such that essentially only a processing, particularly a cracking of the afterinjected fuel, takes place in the combustion chamber. In this manner, additional reducing agent can be provided in the form of hydrocarbons HC in the exhaust gases for regenerating the catalyst. By this measure, it is, on the one hand, possible to vary the combustion air ratio lambda in a desirable manner. On the other hand, by post-injecting fuel in a targeted manner, the adsorber surface or catalyst surface can be heated because of an exothermal reaction taking place there. The power development of the diesel engine is not to be influenced by the post-injected fuel.

Another possibility of obtaining a rich operation of the diesel engine is achieved in another embodiment of the process and system according to the invention in that the characteristic diagram provides a premixture combustion at a point in time which, in comparison to the lean operation, is relative far before the top dead center of the respective piston. An early premixture combustion can be implemented particularly by a start of the preliminary fuel injection which is early in comparison to the lean operation.

In order to obtain an exhaust gas which has a reducing effect, instead of or in addition to the above-described measures through which a fuel quantity which is increased with respect to the lean operation is fed to the combustion, measures may also be applied in which an amount of fresh air is fed to the combustion which is reduced in comparison to the lean operation.

In an expedient embodiment of the process and system according to the invention, for this purpose, in the rich operation, the inlet cross-section in the intake system of each individual cylinder can be reduced because of correspondingly constructed characteristic diagrams. This can be implemented particularly in that, in the intake area of the respective combustion space, a throttle valve is provided which can be operated by way of an actuator by an auxiliary-force-operated actuating drive. This actuating drive is controlled according to the characteristic diagram as a function of signals of the automatic engine control.

An important parameter for the fresh air supply is the scavenging gradient. This is the pressure difference between the gas pressure which exists on the outlet side of the cylinders (exhaust back pressure) and the gas pressure which exists on the inlet side of the cylinders (intake pipe pressure). In a diesel engine with an exhaust gas recirculation device, the exhaust gas recirculation rate acts upon the fresh air supply such that an increased exhaust gas recirculation rate results in a reduced fresh air supply. In a particularly advantageous embodiment of the process and system according to the invention, the characteristic diagrams may provide for the rich operation of the diesel engine to increase the scavenging gradient. Since the exhaust gas recirculation pipe communicates with an exhaust gas collecting chamber behind the cylinder, the exhaust gas in the exhaust gas recirculation system essentially also has the exhaust gas back pressure. As a result, an increased scavenging gradient causes a rise of the exhaust gas recirculation rate and thus a reduction of the fresh air supply, which results in the desired effect of a reduced combustion air ratio lambda.

In order to increase the scavenging gradient, another embodiment of the process and system according to the invention suggests to throttle the fresh air supply of a diesel engine with an exhaust gas recirculation before the fresh air mixes with the exhaust gas recirculation flow. This reduces the pressure in the intake pipe and the scavenging gradient will rise. This has the result that, while the exhaust gas recirculation valve opening cross-section is the same, the exhaust gas quantity fed to the engine by way of the exhaust gas recirculation, that is, the exhaust gas recirculation rate, is increased.

In another embodiment of the process according to the invention, the scavenging gradient between the exhaust gas back pressure and the intake pipe pressure can also be increased in that the exhaust gas back pressure is increased, for example, with a throttle. In particular, it is possible in the case of a diesel engine with an exhaust gas turbocharger to reduce the turbine entrance cross-section and/or the exhaust gas volume flowing through the exhaust gas turbocharger. For this purpose, actuators may again be provided which can be operated by an auxiliary-force-operated actuating drive as a function of signals of the automatic engine control, particularly in a characteristic-diagram-controlled manner.

Other objects, advantages and novel features of the present invention will become apparent from the following detailed description of the invention when considered in conjunction with the accompanying drawings.

DETAILED DESCRIPTION OF THE DRAWINGS

Figure 1:
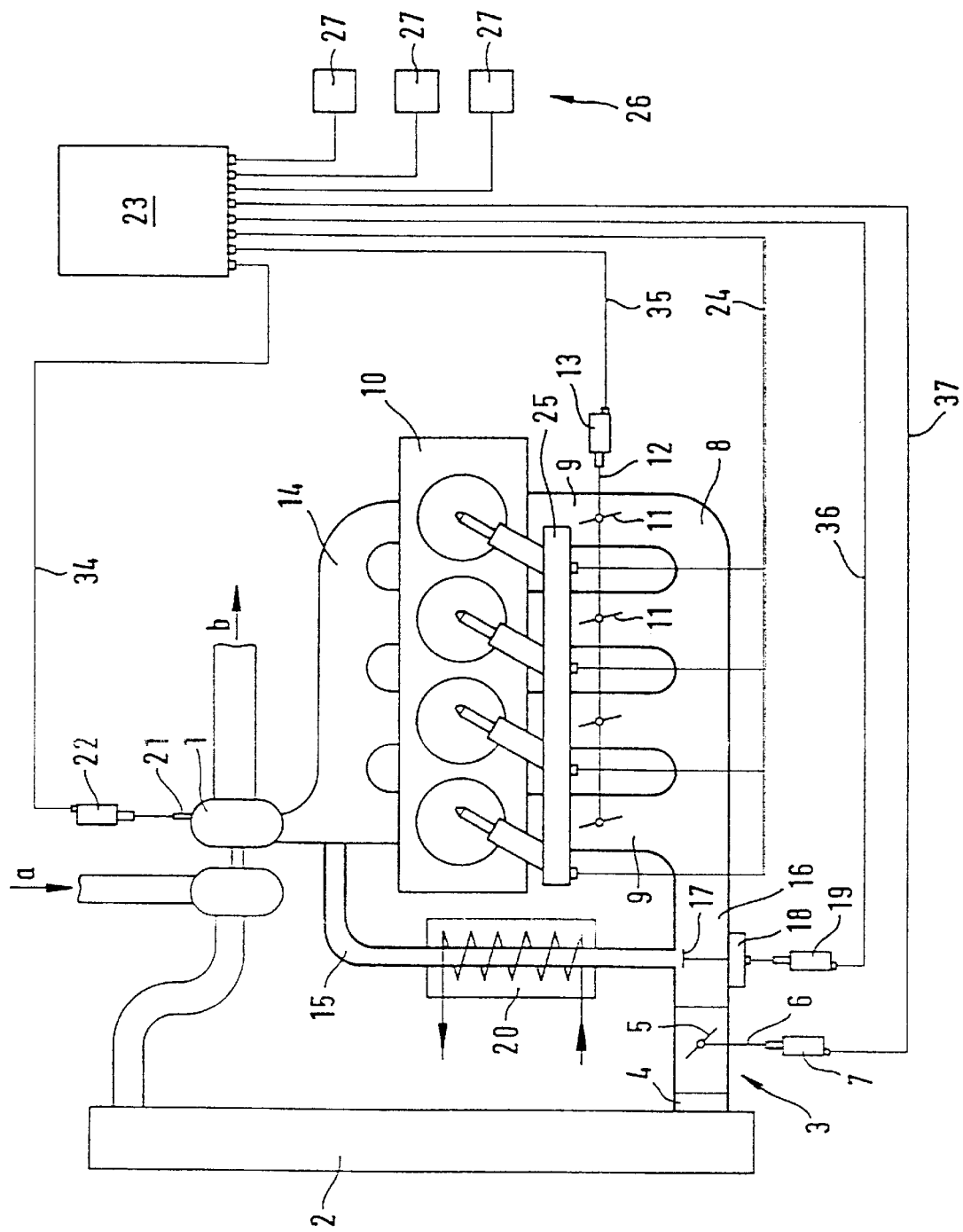
FIG. 1 is a schematic view of a system according to a preferred embodiment of the present invention, including a diesel engine having an exhaust gas recirculation system, an exhaust gas turbocharger and an engine control, in addition to pertaining pipes which connect the individual units with the engine control.

Referring to FIG. 1, an exhaust gas turbocharger 1 takes in fresh air corresponding to the arrow a on its compressor inlet side. At a correspondingly increased pressure, this fresh air flows through a heat exchanger 2 and reaches a throttling point 3 in the intake pipe 4.

At the throttling point 3, a throttle valve 5 is arranged which can be operated by way of an actuator 6 with an auxiliary-force-operated actuating drive 7. Behind the throttling point 3, the fresh air first traverses a suction pipe 16 and then reaches an air collecting chamber 8, from which it is fed by way of separate intake pipe systems 9 to the combustion areas of the diesel engine 10. In the intake pipe systems 9, respective individual throttle valves 11 are arranged which can be operated corresponding to the embodiment by way of a common actuator 12 with an auxiliary-force-operated actuating drive 13.

Downstream of the engine 10, the exhaust gases formed during the combustion are collected in an exhaust gas collecting chamber 14 and are partially fed to the turbine inlet side of the exhaust gas turbocharger 1. In addition, the exhaust gas collecting chamber 14 communicates with an exhaust gas recirculation pipe 15 which leads into the suction pipe 16, that is, downstream of the throttling point 3 and upstream of the air collecting chamber 8, into the air intake pipe 4.

In the mouth area of the exhaust gas recirculation pipe 15, a valve 17 is arranged in the suction pipe 16, which valve 17 can be operated by way of an actuator 18 by an auxiliary-force-operated actuating drive 19.

In the illustrated embodiment, the exhaust gas recirculation pipe 15 is in a heat exchange with a heat exchanger 20 so that optionally a cooling of the recirculated exhaust gas can be achieved.

The turbine inlet cross-section and/or the exhaust gas volume flow flowing through the turbine can be changed by way of an actuator 21 which can be operated by an auxiliary-force-operated actuating drive 22. After flowing through the turbine of the exhaust gas turbocharger 1, the exhaust gas is fed corresponding to the arrow b to an adsorber system which otherwise is not shown.

The diesel engine 10 is controlled or automatically controlled by an engine control or an automatic engine control 23, for the purpose of which this control or automatic control is connected by way of lines with the corresponding units of the diesel engine 10. For example, a line 24 is illustrated in FIG. 1 which connects the automatic engine control 23 with an injection system 25 of the diesel engine 10. Additional lines 34, 35, 36 and 37 connect the automatic engine control 23 with the actuating drives 22, 13, 19 and 7. Furthermore, the automatic engine control 23 is connected with a sensor system 26 whose sensors 27 detect the parameters required for the operation of the diesel engine 10, only three sensors 27 being shown as examples.

Figure 2:
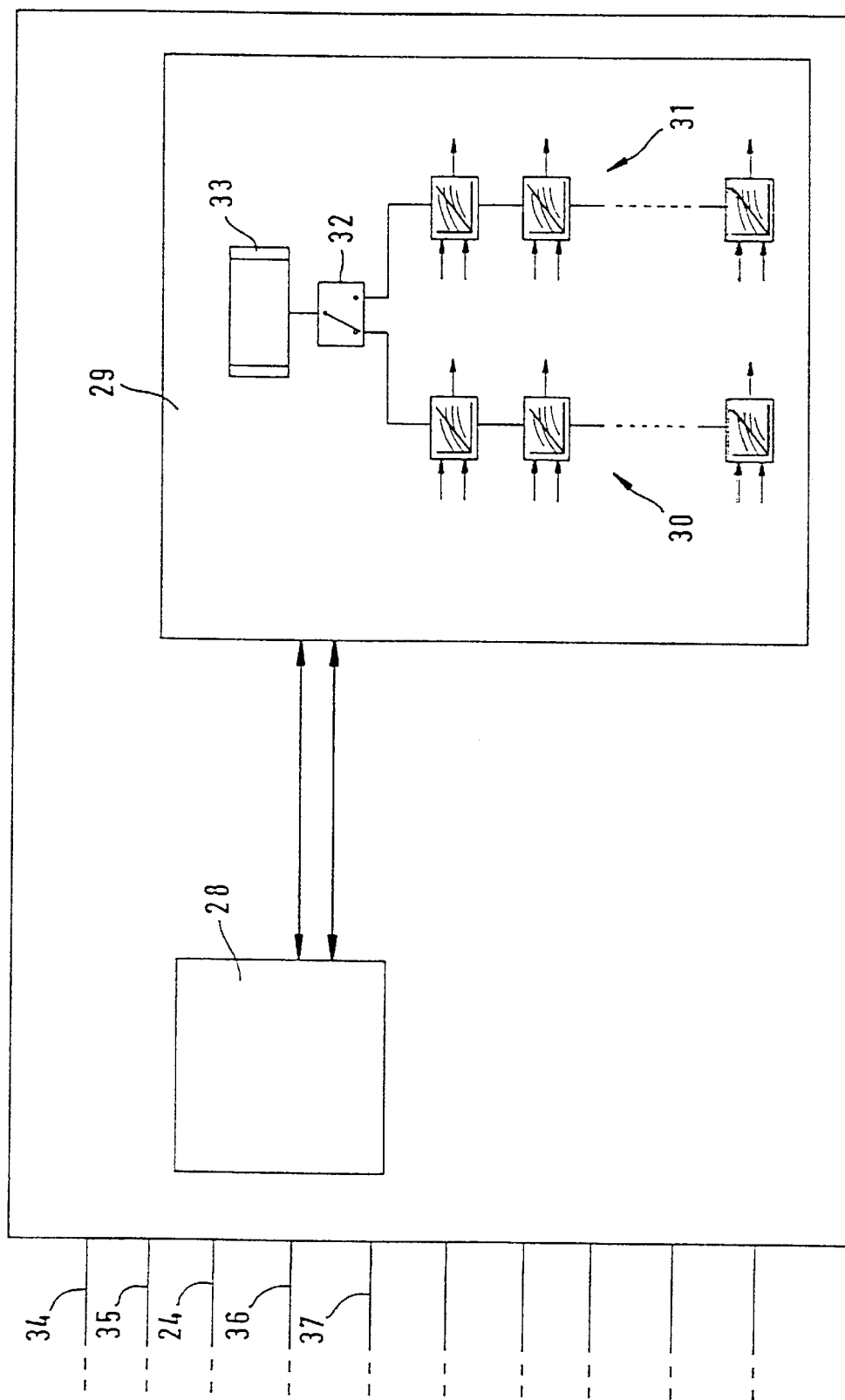
FIG. 2 is a schematic view of a construction of an engine control with a memory containing separate characteristic diagrams.

Corresponding to FIG. 2, the automatic engine control 23 contains a computer 28 as well as a memory 29 communicating therewith. The characteristic diagrams required for the operation of the diesel engine 10, such as a load-dependent characteristic diagram for controlling the injection system 25, etc. are stored in the memory 29. According to the invention, characteristic diagrams 30 are provided for the lean operation of the diesel engine 10 and, independently thereof, separate characteristic diagrams 31 are provided for the rich operation of the diesel engine 10. A software switch 32, whose switching position is determined by change-over criteria 33 stored in the memory, determines to which group of characteristic diagrams 30 or 31 the computer 28 of the automatic engine control 23 accesses. Correspondingly, in the illustrated switching position, the diesel engine 10 is operating in the lean mode. The change-over criteria 33, in turn, are monitored by the computer 28 by the signals generated by the sensors 27 of the sensor system 26. When the predetermined change-over criteria 33 for a change-over from the lean to the rich operation have been met, the integrated software switch 32 is switched from the illustrated position for the lean operation to the other position which permits an access to the characteristic diagram group of the characteristic diagrams 31 responsible for the rich operation of the diesel engine 10.

In order to permit an understoichiometric operation of the engine 10, that is, an operation with a combustion air ratio of λ<1, by way of the pertaining characteristic diagrams 31, the automatic engine control 23 is changed such that the fresh air supply to the combustion spaces is reduced and, as an alternative or in addition, a fuel quantity is fed to the diesel engine 10 which is clearly increased in comparison to the lean combustion operation.

In order to increase the fuel quantity, different measures can be carried out which are coupled essentially to the operating parameters of the injection process. In this case, the corresponding characteristic diagrams 31 for the rich operation influence the injection system 25 by way of the automatic engine control 23.

For example, the injection start of the fuel quantity required for implementing the engine load necessary in the respective operating point of the engine 10 can be displaced in the direction of late crankshaft angles, that is, far toward the upper dead center of the respective piston. In order to be able to achieve the same engine power in the case of an efficiency which was considerably impaired in this manner, a clearly higher fuel quantity must be injected, with the result that the combustion air ratio lambda is reduced. The hydrocarbons HC formed by the incomplete combustion and the carbon monoxide CO create a reducing atmosphere in the exhaust gas flow b, which can be used for regenerating the adsorber catalyst. In addition or as an alternative thereto, the injection pressure can be varied in order to also influence the composition of the exhaust gases.

Also in addition or as an alternative, the preliminary (or pilot) injection can be varied with respect to the injection position and the injection course, whereby an untrue erratic running of the engine can be compensated which may be the result of the late main injection.

Figure 3:
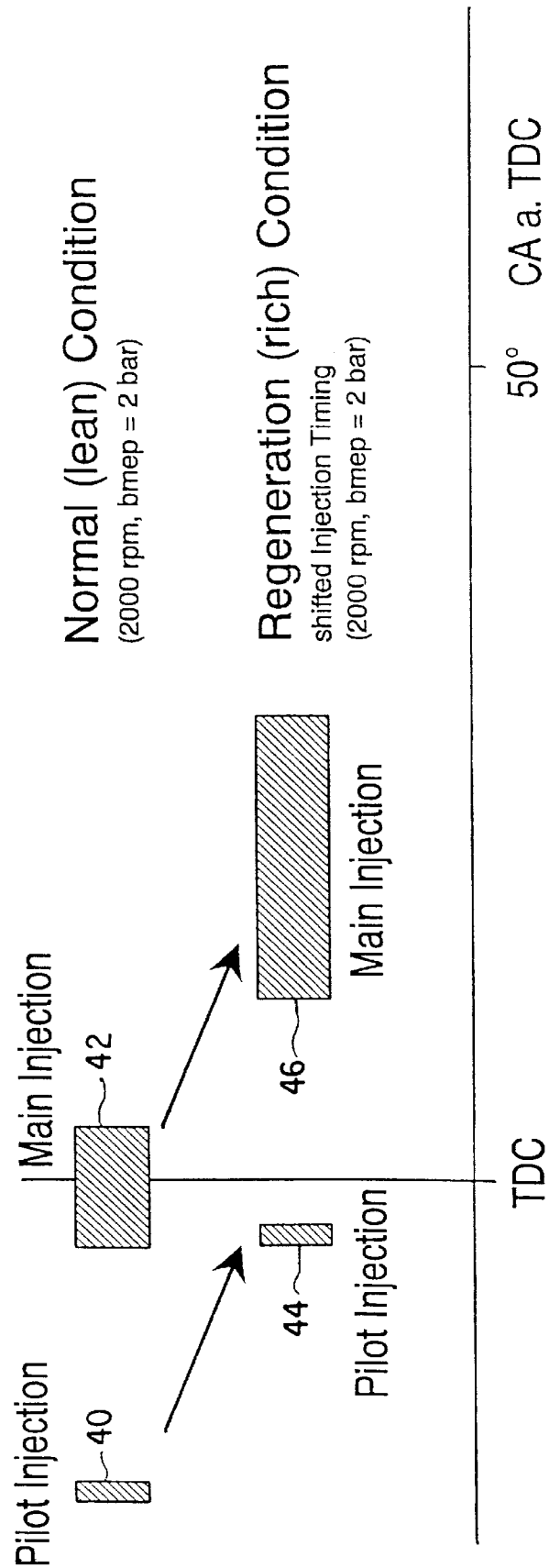
FIG. 3 schematically shows an example of the preliminary (pilot) and main fuel injections for each of the lean and rich operating conditions based on the position of the piston.

FIG. 3 schematically illustrates an example of the pilot (preliminary) injection 40 and the main injection 42 for the normal (lean) operating condition and the pilot (preliminary) injection 44 and the main injection 46 for the regeneration (rich) operating condition, based on the position of the piston, at an operating point of 2000 rpm, bmep=2 bar. In the normal (lean) operating condition, the pilot injection 40 takes place prior to top dead center (TDC) of the piston, and the main injection 42 takes place at top dead center of the piston. In the regeneration (rich) operating condition, the pilot injection 44 is delayed in comparison to the pilot injection 40 of the normal condition, such that it takes place just prior to top dead center of the piston. Similarly, in the regeneration (rich) operating condition, the main injection 46 is delayed in comparison to the main injection 42 of the normal condition, such that it takes place after top dead center of the piston, and also comprises a greater quantity of fuel. Of course, one skilled in the art will recognize that the fuel injection parameters change based on various engine operating conditions, and that FIG. 3 is shown only as an illustrative example of one particular operating point.

Furthermore, in addition or as an alternative, a fuel post-injection can be used, in which case the post-injected fuel does not influence the power of the diesel engine 10 and, in particular, does not increase it. The reason is that the post-injection takes place at such a late point in time that the post-injected fuel is only processed, that is, cracked, whereby additional reducing agent is provided in the form of short-chain hydrocarbons HC for regenerating the catalyst.

In addition to influencing the combustion air ratio lambda, the fuel post-injection can also influence the temperature on the catalyst surface to be regenerated. In this case, a fuel post-injection used in a targeted manner causes a heating of the catalyst surface.

In a diesel engine 10 corresponding to FIG. 1, which has an exhaust gas recirculation pipe 15, an understoichiometric combustion (λ<1) can be achieved in a particularly expedient manner, in which the injection point in time for the main fuel injection is selected extremely late. The reason is that at a certain late injection point in time, the complete diffusion combustion changes to a predominant premixture combustion. Since, in the case of the very late-starting injection, a large portion of the fuel cannot be burnt or can be burnt only incompletely, a correspondingly large proportion of unburnt hydrocarbons returns into the combustion space by way of the exhaust gas recirculation. Because of the compression caused by the rising piston, a very good homogenized mixture is created there which reaches the ignition limit far before the top dead center of the piston and results in a principal premixture combustion. The resulting premixture combustion will then also lead to the combustion air ratio of λ<1. In order to keep additional reducing agents in the exhaust gas flow b, in addition, a late fuel post-injection can be carried out, in which case the fuel which then essentially only still evaporates is itself used as a reducing agent generated inside the engine.

Since the injection point in time at which a change from the diffusion combustion to the premixture combustion takes place depends on the respective operating condition of the diesel engine 10, such an operation of the diesel engine 10 is expediently carried out by way of characteristic diagrams 31 made specifically for this purpose.

When the characteristic diagrams 31 are designed correspondingly, the combustion air ratio lambda can also be reduced in that the fresh air mass fed to the engine 10 is reduced. The measures described in the following for reducing the fresh air mass available for the combustion may be carried out as an alternative or in addition to the above-described measures for increasing the fuel quantity fed to the combustion.

Based on the characteristic diagrams 31 for the rich operation, by way of the connection line 35, the automatic engine control 23 can control the actuating drive 13 such that this actuating drive 13 adjusts by way of the actuator 12 the throttle valves 11 such that these throttle valves 11 reduce the respective inlet cross-section in the intake pipe system 9 of the respective cylinders. In this manner, the cross-section is variably reduced for the air supply from the air collecting chamber 8 so that, on the whole, less air is available to the engine 10 for the combustion.

Also by way of the characteristic diagrams 31 for the rich engine operation, the automatic engine control 23 can control the actuating drive 7 by way of the connection line 37. In order to reduce the combustion air ratio, the actuating drive 7 causes by way of its actuator 6 an adjustment of the throttle valve 5 such that the fresh air taken in through the intake pipe 4 is throttled. In the suction pipe 16, which adjoins the throttling point 3, the pressure is therefore reduced, while simultaneously the scavenging gradient between the exhaust gas back pressure and the suction pipe pressure rises. In the case of a constant opening cross-section of the valve 17 of the exhaust gas recirculation pipe 15, this results in an increased exhaust gas throughput, that is, in an increased exhaust gas recirculation rate. This measure therefore reduces the combustion air ratio lambda.

The scavenging gradient can also be changed in that the turbine inlet cross-section of the exhaust gas turbocharger 1 and/or the exhaust gas quantity flowing through the turbine is altered. Such an alteration may be triggered by the corresponding characteristic diagrams 31 by way of the automatic engine control 23 via the connection line 34, in which case the actuating drive 22 operates the actuator 21 in the corresponding manner.

In the case of the above-mentioned embodiments for influencing the composition of the air feed, the scavenging gradient between the exhaust gas back pressure and the suction pipe pressure is changed, whereby the exhaust gas recirculation rate can be varied without the requirement of changing the exhaust gas recirculation valve opening cross-section for this purpose. A change of the composition of the air fed to the combustion can also be achieved by changing the exhaust gas recirculation valve opening cross-section. For this purpose, a corresponding characteristic diagram 31 has the effect that the automatic engine control 23 correspondingly triggers the actuating drive 19 by way of the connection line 36. In this case, the actuating drive 19 causes the desired adjustment of the valve 17 by way of its actuator 18.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for operating a diesel engine having an automatic engine control which automatically controls the diesel engine as a function of characteristic diagrams between a rich operation and a lean operation, said process comprising:
   controlling a changeover between said rich operation and said lean operation as a function of predetermined changeover criteria via a computer;
   monitoring parameters necessary for said change-over criteria via a sensor system communicated with the computer; and
   selectively recalling separate characteristic diagrams and for the lean operation and the rich operation of the diesel engine stored in a memory which communicates with the computer.

2. A process according to claim 1, wherein the characteristic diagrams for the rich operation of the diesel engine are selected such that, in comparison to the lean operation, the fuel combustion in each of the combustion spaces of the diesel engine takes place only relatively far after the top dead center of the respective piston.

3. A process according to claim 2, wherein in comparison to the lean operation, a point in time of a main fuel injection during the rich operation is at least one of: (a) selected relatively late; (b) the injection pressure is reduced; (c) the injection duration is extended; and (d) the injection quantity is increased.

4. A process according to claim 2, wherein before a main fuel injection, a preliminary injection takes place which, in comparison to the lean operation, has at least one of a changed injection start and a changed injection duration.

5. A process according to claim 4, wherein, with respect to said at least one of a changed injection start and a changed injection duration, the preliminary injection is coordinated with the fuel combustion which is delayed in comparison to the lean operation such that a uniform running of the engine is ensured.

6. A process according to claim 1, wherein the characteristic diagrams for the rich operation of the diesel engine are selected such that, in comparison to the lean operation, a point in time for the start of a main fuel injection is selected so late that a premixture combustion occurs in an exhaust gas recirculation with a relatively high recirculation rate.

7. A process according to claim 6, wherein a fuel post-injection is provided which takes place at such a late point in time that the post-injected fuel essentially evaporates.

8. A process according to claim 1, wherein the characteristic diagrams for the rich operation of the diesel engine are selected such that, after a main fuel injection, a fuel post-injection takes place such that essentially a processing or cracking of the post-injected fuel takes place in the respective combustion space.

9. A process according to claim 1, wherein the characteristic diagrams for the rich operation of the diesel engine are selected such that, in comparison to the lean operation, the premixture combustion takes place at a point relatively far in front of the top dead center of the respective piston.

10. A process according to claim 9, wherein, in comparison to the lean operation, a point in time of the preliminary fuel injection is selected relatively early.

11. A process according to claim 1, wherein the characteristic diagrams for the rich operation of the diesel engine are selected such that, in comparison to the lean operation, cross-sections provided for the air inlet into the individual combustion spaces are throttled.

12. A process according to claim 11, wherein, for throttling the air inlet cross-sections for every cylinder of the diesel engine, a throttle valve arranged in an intake section is operable by way of an actuator by an auxiliary-force-operated actuating drive in a controlled manner as a function of signals of the automatic engine control.

13. A process according to claim 1, wherein the characteristic diagrams for the rich operation of the diesel engine are selected such that the pressure difference—scavenging gradient—between the pressure of the gases after the combustion—exhaust gas back pressure—and the pressure of the gases before the combustion—suction pipe pressure—is increased.

14. A process according to claim 13, wherein the diesel engine is provided with an exhaust gas recirculation, the cross-section of a fresh air feed being throttled in front of a connection point of the exhaust gas recirculation to the air feed to a suction pipe.

15. A process according to claim 14, wherein in the fresh air feed, at least one throttle valve arranged in front of the connection point of the exhaust gas recirculation is operable by way of an actuator by an auxiliary-force-operated actuating drive in a controlled manner as a function of signals of the automatic engine control.

16. A process according to claim 13, wherein the diesel engine is provided with an exhaust gas turbocharger, at least one of a turbocharger turbine inlet cross-section and an exhaust gas flow-through volume being reduced by the exhaust gas turbocharger.

17. A according to claim 16, wherein at least one of the turbine inlet cross-section and the exhaust gas flow-through volume is changeable via an actuator operable in a controlled manner by an auxiliary-force-operated actuating drive as a function of signals of the automatic engine control.

18. A system for operating a diesel engine, having an automatic engine control which automatically controls the diesel engine as a function of characteristic diagrams between a rich operation and a lean operation, said automatic engine control comprising:

a computer which controls a changeover between said rich operation and said lean operation as a function of predetermined change-over criteria;

a sensor system which communicates with the computer and monitors parameters necessary for said change-over criteria; and a memory which communicates with the computer and in which separate characteristic diagrams and for the operation of the diesel engine are stored for the lean operation and for the rich operation.

* * * * *